Dec. 1, 1953 M. H. ALLDREDGE 2,660,907
IDLER ARM
Filed Feb. 25, 1950
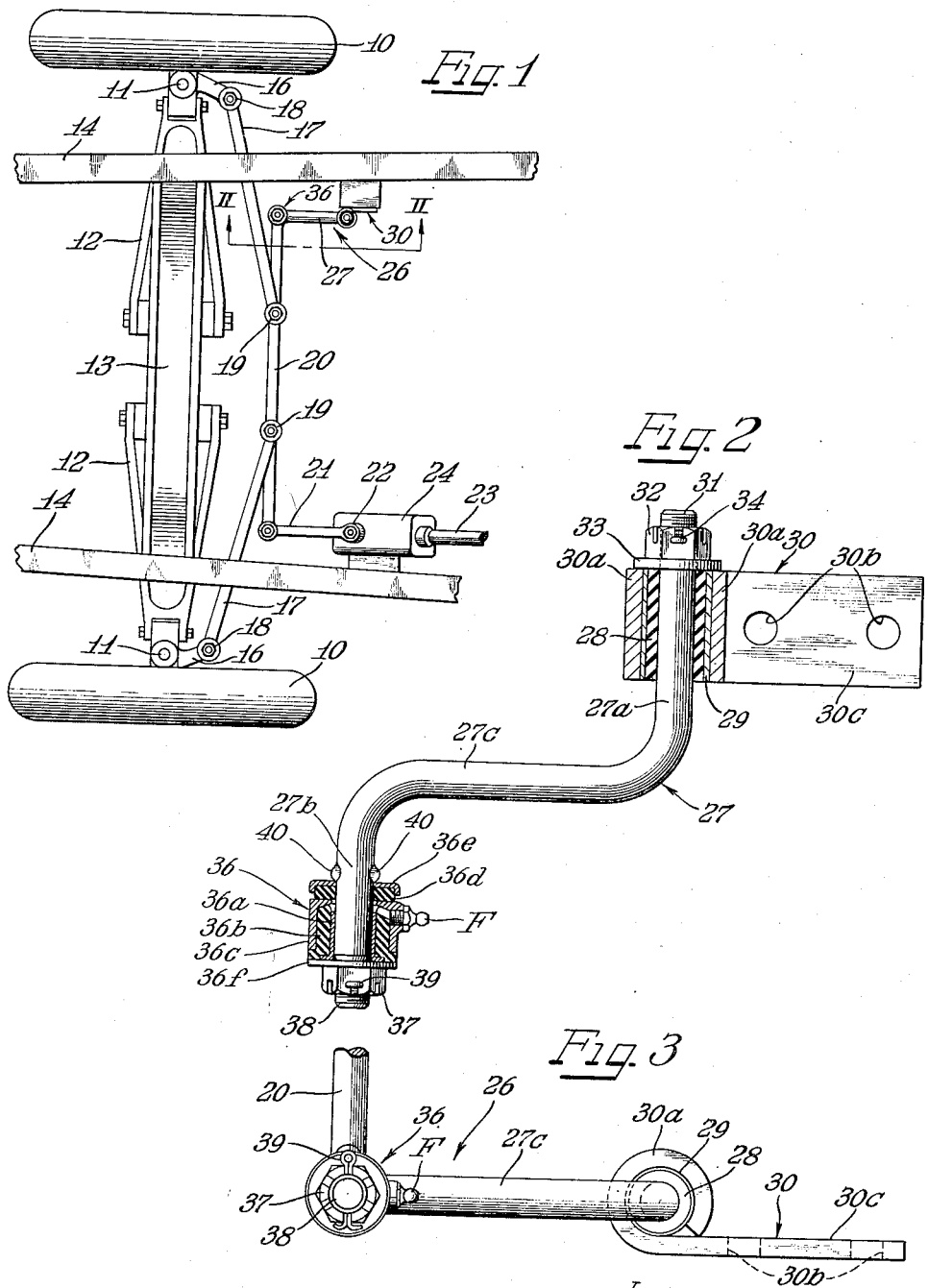
Inventor
Marshall H. Alldredge Patented Dec. 1, 1953

2,660,907

UNITED STATES PATENT OFFICE 2,660,907

IDLER ARM

Marshall H. Alldredge, Detroit, Mich., assignor to Thompson Products, Inc., Cleveland, Ohio, a corporation of Ohio Application February 25, 1950, Serial No. 146,193

5 Claims. (Cl. 74—579)

1

This invention relates generally to an improved steering mechanism for a dirigible vehicle and more particularly relates to an idler arm construction for a parallelogram-type steering linkage, the idler arm incorporating a resilient elastic bearing permitting relative angular movement between two elements without necessitating relative movement between bearing surfaces thereof.

In the parallelogram-type steering linkage employed on many contemporary dirigible vehicles, a cross-link extending transversely of the vehicle frame is actuated at one end by a pitman arm operatively connected to a steering column through a gear box. The free end of the cross-link is usually supported by an idler arm assembly so as to promote straight longitudinal movement of the cross-link by the pitman arm.

According to the general features of the present invention, a bracket is attached to the frame of the vehicle, preferably the side adjacent the free end of the cross-link, and this bracket is provided with a bearing block or a housing portion adapted to retain and enclose a resilient elastic bearing sleeve. The idler arm, which may take the form of a bar of steel suitably bent to bring the linkage into proper relationship with the bracket is inserted within the sleeve and the arm is locked to the bracket to preclude inadvertent axial movement relative thereto.

Since the housing portion of the bracket, the resilient elastic sleeve and the idler arm are in snug relationship with one another, the motion of the idler arm, which normally may be through an arc of approximately 90 degrees, will cause no movement between bearing surfaces but will produce only a torsional movement in the bearing sleeve.

It is, therefore, an object of the present invention to provide an idler arm for a vehicular steering assembly in which a bearing joint is provided wherein relative angular displacement of the joint elements will produce a torsional movement only in a resilient elastic sleeve or bushing or bearing.

Another object of the present invention is to provide an idler arm assembly for a vehicular steering linkage which may be economically produced by a novel process requiring the use of a reduced number of simplified elements.

Yet another object of the present invention is to provide a bearing joint for an idler arm in a vehicular steering assembly which does not require lubrication.

A further object of the present invention is to provide a bearing joint for an idler arm in a vehicular steering linkage in which the elements are assembled in a predetermined fixed angular relationship so that binding and freezing between the bearing surfaces is substantially precluded, even though limited angular movement is permitted.

A still further object of the present invention is to provide a novel method of manufacturing an idler arm and mounting the idler arm between a vehicular steering linkage and a vehicle frame, whereby the linkage may be supported in proper geometric relationship relative to a pitman arm connected to another portion of the vehicular steering linkage.

Many other features, advantages and additional objects of the present invention will become manifest to those versed in the art upon making reference to the detail description which follows and the accompanying sheet of drawings, in which:

Figure 1 is a fragmentary top plan view of an automobile chassis having a parallelogram-type steering linkage equipped with an idler arm according to the present invention;

Figure 2 is an enlarged elevational view with parts broken away and with parts shown in vertical cross-section taken on line II—II of Figure 1 showing the details of construction of the idler arm according to the present invention; and Figure 3 is an enlarged bottom plan view of the idler arm shown in Figure 2.

As shown on the drawings:

Referring first to Figure 1, a pair of wheels 10, 10 of a dirigible vehicle are shown supported on sub-axles (not shown) and pivoted on king pins 11, 11. The wheels are supported by wheel arms 12, 12 from a transverse beam 13 of a vehicle frame which also includes side beams 14, 14.

A pair of steering arms 16, 16 extend rearwardly from the sub-axle assemblies of the wheels 10, 10 and are pivotally connected to a pair of tie rods 17, 17 through a ball and socket type joint 18, 18.

The tie rods 17, 17 extend inwardly and are pivotally connected by means of a ball and socket type joint 19, 19 to a cross-link 20 pivotally connected at one end to a pitman arm 21 suspended on a rockshaft 22 which may be selectively rotated by a steering column 23 operatively connected to the rockshaft 22 through a gear box 24 affixed to the side beam 14 adjacent thereto.

In order to support the steering linkage in proper geometric relationship and in order to properly transmit a steering load through a change of direction, an idler arm assembly indicated generally by the reference numeral 26 provides a movable joint between the other end of the cross-link 20 and one of the side beams 16 of the vehicle frame.

Referring more specifically to Figures 2 and 3, the idler arm assembly 26 is shown as including an idler arm 27 which may be conveniently formed from an ordinary piece of bar stock shaped in the general configuration of a crank with oppositely extending parallel arm portions 27a and 27b joined by a central portion 27c. The shape and dimension of the idler arm 27 is intended to bring the linkage into proper relationship with a bearing about to be described.

A sleeve-type bearing or bushing 28 (Figure 2) made of a suitable rubber-like resilient elastic material snugly engages the arm 27a of the idler arm 27 near one end thereof.

In this particular embodiment, a tubular retainer 29 is employed to surround and enclose the bearing or bushing 28.

A bracket 30 is provided which, in its original form, may conveniently comprise an ordinary piece of flat metal bar stock. One end may be curled to form a loop which functions as a bearing block or housing 30a while the other end, which remains flat, may be apertured as at 30b to function as a fastening portion 30c. It will be noted upon making reference to the drawings that the bracket 30 is shaped much in the same manner as a hinge.

The bearing block or housing portion 30a of the bracket 30 is placed in surrounding relationship to the bearing or bushing 28 and the arm 27a of the idler arm 27 by pressing the tubular retainer 29 into the eye or the bore of the housing 30a. Thus, even though the bore of the housing 30a may not be truly cylindrical, a firm assembly may be produced.

Under ordinary circumstances, the frictional relationship between the housing 30a of the bracket 30, the tubular retainer 29, the bearing or bushing 28 and the arm 27a of the idler arm 27 will be such as to substantially prevent axial movement of the idler arm 27 with respect to the bracket 30, however, for purposes of safety, the end of the idler arm 27 may be threaded as at 31 to receive a nut 32 to hold a washer 33 in abutting engagement with one end of the housing 30a. A cotter pin 34 may be employed in a well-known manner to lock the nut 32 to the threaded portion 31 of the idler arm 27.

It will be appreciated that the normal motion of the idler arm will result in an angular displacement of the arm 27a through an arc of approximately 90 degrees, however, according to the present invention, there is no movement between bearing surfaces of the housing 30a, the tubular retainer 29, the bearing or bushing 28 and the idler arm 27 since all angular displacement of the idler arm will be completely accommodated by torsional movement only in the bearing or bushing 28.

The other end of the idler arm 27 may be connected to the cross-link 20 by means of rubber bushed metal sleeve bearing indicated generally by the reference numeral 36 which may be fixed in predetermined axial position on the arm 27b of the idler arm 27. The arm 27b of the idler arm 27 may be provided with locking structure including a castellated nut 37 threaded onto a threaded portion 38 on the end of the arm portion 27b and held in place by a cotter pin 39. Pinched out ears 40 on the arm portion 27b abut the other side of the bearing assembly 36.

The bearing assembly 36 includes a metal sleeve 36a rotatably receiving the arm portion 27b and resiliently held by a rubber bushing 36b in an eye housing 36c on the end of cross-link 20. The housing is equipped with a lubricant fitting "F" to lubricate the sleeve and rod. A rubber washer 36d overlies the housing and is partly contained in a cap 36e abutting the ears 40. A metal washer underlies the housing 36c and is abutted by nut 37. The assembly accommodates free steering rotation between the sleeve and arm while interparticle flow of the rubber of the bushing 36b permits deformation which will accommodate misalignment of the parts. This rubber bushing is also effective to snub or dampen out rotation of the link relative to the axis of the idler arm.

It will be apparent that the idler arm construction of the present invention has many advantages since the bearing between the idler arm 27 and the bracket 30 provides a permanent connection which does not require lubrication and which precludes the magnification of rattling noises originating in the steering linkage by the steering column. Moreover, all of the elements of the assembly may be economically produced from simplified elements, for example, the idler arm may be formed from commercially available bar stock since it requires no finishing to produce an accurate bearing surface for the bearing or bushing 28.

It is possible that various minor modifications may occur to persons skilled in the art upon making reference to the details which have been employed to adequately describe this preferred embodiment, however, it should be clearly understood that I wish to embrace within the scope of this patent all such embodiments as reasonably and properly come within the scope of my contribution to the art.

I claim as my invention:

1. In a vehicular steering linkage, a cross-link, a metal bearing on one end thereof, an idler arm having one end thereof journalled in the metal bearing, a rubber-like material on the other end of the idler arm, and a bracket having an apertured flat portion for attachment to a vehicle frame and being bent back upon itself at one end to provide a curled eye portion surrounding the rubber-like material and fastening means connecting the bracket to the vehicle frame, whereby angular displacement of the idler arm will produce only torsional movement in the rubber-like material.

2. In a vehicular steering linkage, a cross-link, a metal bearing on one end thereof, an idler arm having one end thereof journalled in the metal bearing, a rubber-like material on the other end of the idler arm, a bracket having an apertured flat portion for attachment to a vehicle frame and being bent back upon itself at one end to provide a curled eye portion surrounding the rubber-like material, fastening means connecting the bracket to the vehicle frame, and locking means between the bracket and the idler arm to preclude axial displacement therebetween, whereby angular displacement of the idler arm will produce only torsional movement in the rubber-like material.

3. In an idler arm assembly for a vehicular steering linkage mechanism, a vehicle frame idler arm, a bearing sleeve on one end thereof made of elastic material, and a bracket having an apertured flat portion for attachment to a vehicle frame bent back upon itself at one end to provide a curled eye portion surrounding the bearing sleeve in firm assembly therewith to clamp said sleeve and said one end of said idler arm in bonded assembly, and connecting means at the other end of said idler arm for connecting said idler arm to the vehicular steering linkage mechanism for angularly displacing the idler arm relative to the bracket within the limits of torsional elasticity of the bearing sleeve.

4. In an idler arm assembly as defined in claim 3, a tubular retainer enclosing said bearing sleeve, said eye portion receiving said retainer in firm assembly.

5. In an idler arm assembly as defined in claim 4, said connecting means more particularly comprising a metal bearing.

MARSHALL H. ALLDREDGE.

References Cited in the file of this patent

UNITED STATES PATENTS

| Number | Name | Date |
|---|---|---|
| 1,552,645 | Powell | Sept. 8, 1925 |
| 1,607,205 | Lord | Nov. 16, 1926 |
| 1,707,213 | Lord | Mar. 26, 1929 |
| 1,721,288 | Thirty | July 16, 1929 |
| 1,862,027 | Lord | June 7, 1932 |
| 1,886,143 | Zaparka | Nov. 1, 1932 |
| 2,068,474 | Schwinn | Jan. 19, 1937 |
| 2,152,506 | Thorne | Mar. 28, 1939 |
| 2,156,580 | Best | May 2, 1939 |
| 2,448,851 | Wharem et al. | Sept. 7, 1948 |
| 2,464,982 | Leighton | Mar. 22, 1949 |
| 2,470,215 | Graham | May 17, 1949 |
| 2,479,339 | Gair | Aug. 16, 1949 |
| 2,488,979 | Kogstrom | Nov. 22, 1949 |